(12) United States Patent
Higashihara

(10) Patent No.: US 7,425,989 B2
(45) Date of Patent: Sep. 16, 2008

(54) IMAGE-PICKUP UNIT INCLUDING A FLEXIBLE CIRCUIT BOARD ON A SURFACE OF WHICH AN IMAGE-PICKUP ELEMENT IS DISPOSED

(75) Inventor: Masaki Higashihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 688 days.

(21) Appl. No.: 10/909,297

(22) Filed: Aug. 3, 2004

(65) Prior Publication Data

US 2005/0041310 A1    Feb. 24, 2005

(30) Foreign Application Priority Data

Aug. 20, 2003    (JP) .............................. 2003-296940

(51) Int. Cl.
*H04N 5/225*    (2006.01)
(52) U.S. Cl. ...................................... 348/374; 257/434
(58) Field of Classification Search ................. 348/373, 348/374; 257/432–434; 359/819
See application file for complete search history.

(56) References Cited

U.S. PATENT DOCUMENTS

| 5,523,811 | A | 6/1996 | Wada et al. |
| 5,612,826 | A * | 3/1997 | Ohshita .................... 359/819 |
| 6,665,455 | B1 * | 12/2003 | Ting .......................... 382/312 |
| 6,939,456 | B2 * | 9/2005 | Shiau ....................... 250/208.1 |
| 6,949,808 | B2 * | 9/2005 | Harazono ................... 257/433 |
| 7,180,546 | B2 * | 2/2007 | Kobayashi .................. 348/374 |
| 2001/0055073 | A1 * | 12/2001 | Shinomiya .................. 348/374 |
| 2002/0191103 | A1 * | 12/2002 | Akimoto et al. ............. 348/374 |

FOREIGN PATENT DOCUMENTS

| JP | 2001-309244 | 11/2001 |
| JP | 2002-218293 | 8/2002 |

* cited by examiner

*Primary Examiner*—Ngoc-Yen Vu
*Assistant Examiner*—Albert H Cutler
(74) *Attorney, Agent, or Firm*—Fitzpatrick, Cella, Harper & Scinto

(57) ABSTRACT

There is disclosed an image-pickup unit which is capable of locating precisely an image-pickup element and capable of repressing a separation of a cover glass or the image-pickup element and the flexible circuit board. The image-pickup unit comprises an image-pickup element, disposed at the side of a first surface of a flexible circuit board, for converting light incident through an opening portion formed in the circuit board into an electrical signal; a cover member fixed to a second surface of the circuit board to cover the opening portion; a first holding member disposed at the side of the first surface; and a second holding member, for holding an optical element disposed at the side of an incident surface of the cover member, held by the first holding member. The first holding member is in contact with the first surface of the circuit board, and a biasing member biases the cover member from the side of the second holding member toward the first holding member.

7 Claims, 13 Drawing Sheets

IMAGE-PICKUP UNIT INCLUDING A FLEXIBLE CIRCUIT BOARD ON A SURFACE OF WHICH AN IMAGE-PICKUP ELEMENT IS DISPOSED

BACKGROUND OF THE INVENTION

1. Field of the Invention

The present invention relates to an image-pickup unit which is used for an image-taking apparatus such as a digital camera.

2. Description of the Related Art

In Japanese Patent Application Laid-Open No. 2002-218293, a method of mounting a solid image-pickup element on an image-taking apparatus such as a digital camera etc. by using a hollow TAB (tape automated bonding) package is disclosed. In this mounting method, a locating hole is provided in a TAB tape (flexible circuit board) which is located at and fixed to a structural member of a camera using the locating hole.

Further, the hollow TAB package is located at and held along an optical axis in such a manner that the structural member is in contact with the surface of the TAB tape toward an image-taking lens.

In addition, in Japanese Patent Application Laid-Open No. 2001-309244, a method of forming a metallic film on a cover glass is disclosed, in which metallic components provided in an apparatus such as a camera are connected to the metallic film of the cover glass by melting, cooling and hardening metallic material such as solder.

However, in a mounting method disclosed in Japanese Patent Application Laid-Open No. 2002-218293, since the TAB package is located and held at the optical axis by using the TAB tape, the following problems commonly occur.

The TAB tape may be easily bent, and further it may be deformed in a bending direction of the tape due to low rigidity. Therefore, if a force is applied to the TAB tape by the weight of the hollow TAB package or by a shock when dropped, the shape of the TAB tape typically deforms to change the location of a light-receiving surface of the image-pickup element.

Further, in the above mounting method, since the cover glass or the image-pickup element is bonded and fixed to the TAB tape, these components are held so as to be hanged by the TAB tape within a camera. Thus, if a force is applied to the cover glass or the image-pickup element, for example, by a shock when dropped, a bonding connection may be easily separated.

In addition, in the mounting method disclosed in Japanese Patent Application Laid-Open No. 2002-218293, a locating hole is provided in a first wiring portion (connecting portion) of the TAB tape for reading out signal from the image-pickup element. Accordingly, the connection between the first wiring portion of the TAB tape and another board wiring portion is made by bending a second wiring portion formed outside the locating hole of the TAB tape. Therefore, the wiring length of the second wiring portion of the TAB tape increases. Further, if the wiring length of the second wiring portion is increased, the signal from the image-pickup element is easily influenced by an external noise. Further, since the TAB tape has a longer length, the manufacturing cost increases. In addition, the size of an image-taking apparatus also increases inconveniently.

Meanwhile, in a mounting method suggested by Japanese Patent Application Laid-Open No. 2001-309244, since a high temperature melting solder is used, it causes the deformation of the cover glass or the image-pickup element due to a thermal stress when cooling.

SUMMARY OF INVENTION

It is an object of the present invention to provide an image-pickup unit which is capable of locating precisely an image-pickup element on a main body of an image-taking apparatus, repressing the separation between a cover glass or the image-pickup element and a flexible circuit board, and reducing a length of the flexible circuit board.

An image-pickup unit according to an aspect of the present invention comprises: a flexible circuit board having an opening portion through which light passes; an image-pickup element, disposed at the side of a first surface of the circuit board and electrically connected to the circuit board, for converting light incident through the opening portion into an electrical signal; a cover member fixed to a second surface opposite to the first surface of the circuit board to cover the opening portion; a first holding member disposed at the side of the first surface of the circuit board; an optical element disposed at the side of an incident surface of the cover member; a second holding member being held by the first holding member for holding the optical element; and a biasing member for biasing the cover member. Further, the first holding member is in contact with the first surface of the circuit board. In addition, the biasing member biases the cover member from the side of the second holding member toward the first holding member.

In addition, an image-pickup unit according to another aspect of the present invention comprises: a flexible circuit board having an opening portion through which light passes; an image-pickup element, disposed at the side of a first surface of the circuit board and electrically connected to the circuit board, for converting light incident through the opening portion into an electrical signal; and a cover member fixed to a second surface opposite to the first surface of the circuit board to cover the opening portion. Further, the circuit board has a wiring portion having wiring lines connected to the image-pickup element and a locating portion for locating the image-pickup element on the circuit board. In addition, the locating portion and the wiring portion are separated from each other.

The feature of the image-pickup unit and the image-taking apparatus comprising the same is made clear by explaining specific embodiments with reference to the drawings.

DETAILED DESCRIPTION OF THE PREFERRED EMBODIMENTS

Embodiments of the present invention will now be described.

Embodiment 1

Figure 1:
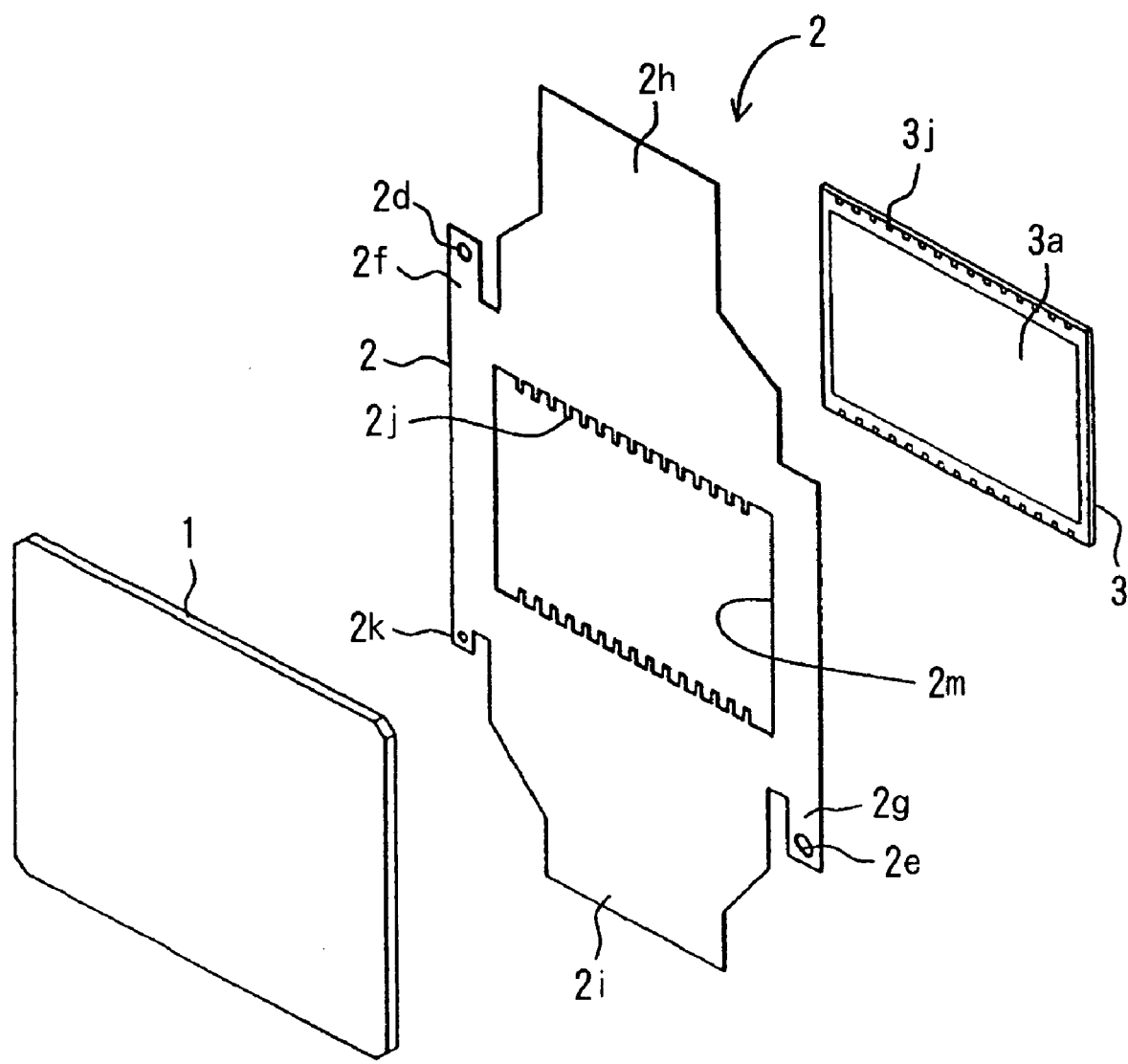
FIG. 1 is an exploded perspective view of a TAB package according to Embodiment 1 of the present invention which is used for an image-pickup unit.
Figure 2:
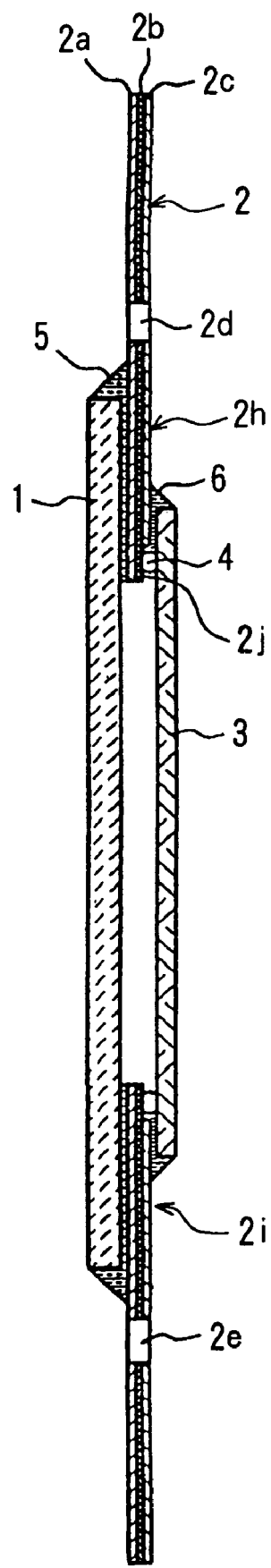
FIG. 2 is a cross-sectional view of the TAB package of Embodiment 1.

FIG. 1 shows an exploded outline of a TAB package according to Embodiment 1 of the present invention constituting a portion of an image-pickup unit which is mounted on a digital camera (image-taking apparatus). In addition, FIG. 2 is a cross-sectional view showing a state in which the TAB package is assembled. A TAB tape 2, which is a flexible circuit board, is comprised of a base film 2a, a copper foil pattern 2b formed at a rear side of the base film 2a, and a cover lay film 2c covering the copper foil pattern. Further, the TAB tape 2 has a rectangular opening portion 2m for transmitting light to be incident from a front surface. On a rear surface (a first surface) of the TAB tape 2, an image-pickup element 3 is disposed in such a manner that a light-receiving surface 3a is directed to the opening portion 2m.

A plurality of connecting portions 2j of the copper foil pattern 2b, which are protruded toward an inside of the opening portion 2m, are not covered with the cover lay film 2c. The connecting portions 2j are electrically connected to land portions 3j formed in a periphery of the light-receiving surface 3a at the front surface of the image-pickup element 3 via bumps 4, respectively. Thus, it is possible to drive the image-pickup element 3 or read out an electrical signal from the image-pickup element 3 via wiring portions 2h and 2i in the copper foil pattern 2b (namely, the TAB tape 2), which are extended in upward and downward directions from the image-pickup element 3.

Further, as shown in FIG. 2, the image-pickup element 3 is bonded and fixed to the periphery portion of the opening portion 2m in the rear surface of the TAB tape 2 with a sealing material (adhesive) 6.

Meanwhile, to the periphery portion of the opening portion 2m at a front surface (a second surface) of the TAB tape 2, a cover glass 1 is bonded and fixed with a sealing material (adhesive) 5 to cover the opening portion 2m (namely, to cover the light-receiving surface 3a of the image-pickup element 3). The sealing material 6 is interposed between the TAB tape 2 and the image-pickup element 3, and the sealing material 5 is interposed between the TAB tape 2 and the cover glass 1. As a result, it is repressed that a foreign substance is introduced into a space between the cover glass 1 and the image-pickup element 3.

Figure 5:
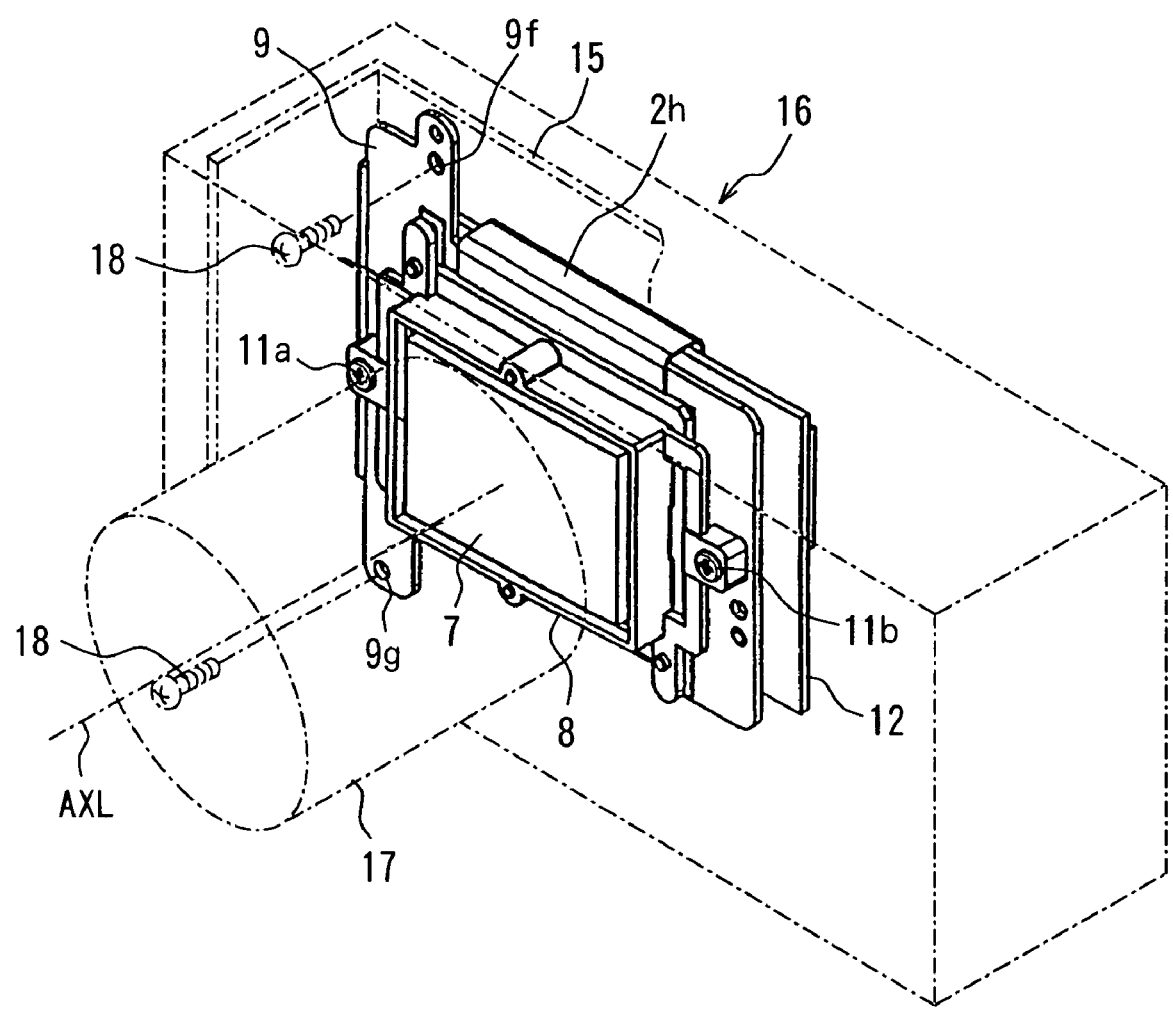
FIG. 5 is a perspective view showing a state in which the image-pickup unit of Embodiment 1 is mounted on a camera.

Further, in the TAB tape 2, locating extended portions (locating portions) 2f and 2g respectively having locating holes 2d and 2e are formed in a forked (separated) shape from the wiring portions 2h and 2i. Moreover, the locating extended portions 2f and 2g extend substantially parallel to the wiring portions 2h and 2i. The locating holes 2d and 2e are to locate the TAB package on a sensor plate described below with respect to a direction perpendicular to an image-taking optical axis. By using the locating holes 2d and 2e, the TAB package is precisely mounted on the sensor plate and further the sensor plate is precisely mounted on a main body of the camera. Therefore, as shown in FIG. 5, the image-pickup element 3 can be precisely aligned with the image-taking optical axis AXL of an image-taking lens 17 provided in the camera 16.

If a light flux is incident on the cover glass 1 from the image-taking lens 17 and reaches the light-receiving surface 3a of the image-pickup element 3, the image-pickup element 3 converts the incident light flux to charges and generates an image-pickup signal. The image-pickup signal is sent to a signal processing board (See FIG. 6.) via the wiring portions 2h and 2i to which the copper foil pattern 2b of the TAB tape 2 is connected. Subsequently, the signal processing board amplifies the image-pickup signal with an amplifier, makes A/D conversion, and performs a predetermined signal processing, to thereby form an image data. The image data is recorded in a recording medium (semiconductor memory, magnetic disk, optical disk or the like) which is not shown or is displayed on a display panel which is not shown.

Here, since the image-pickup signal generated by the image-pickup element 3 is a very weak electrical signal, it is more easily influenced by an electromagnetic noise from peripheral circuits if a wiring line from the image-pickup element 3 to the signal processing board is longer. Therefore, it is preferable to shorten greatly the wiring lengths of the wiring portions 2h and 2i of the TAB tape 2. Further, if the TAB tape becomes longer, a manufacturing cost of the TAB tape also becomes higher, and thus it is preferable to shorten greatly the wiring lengths of the wiring portions 2h and 2i of the TAB tape 2.

Figure 8:
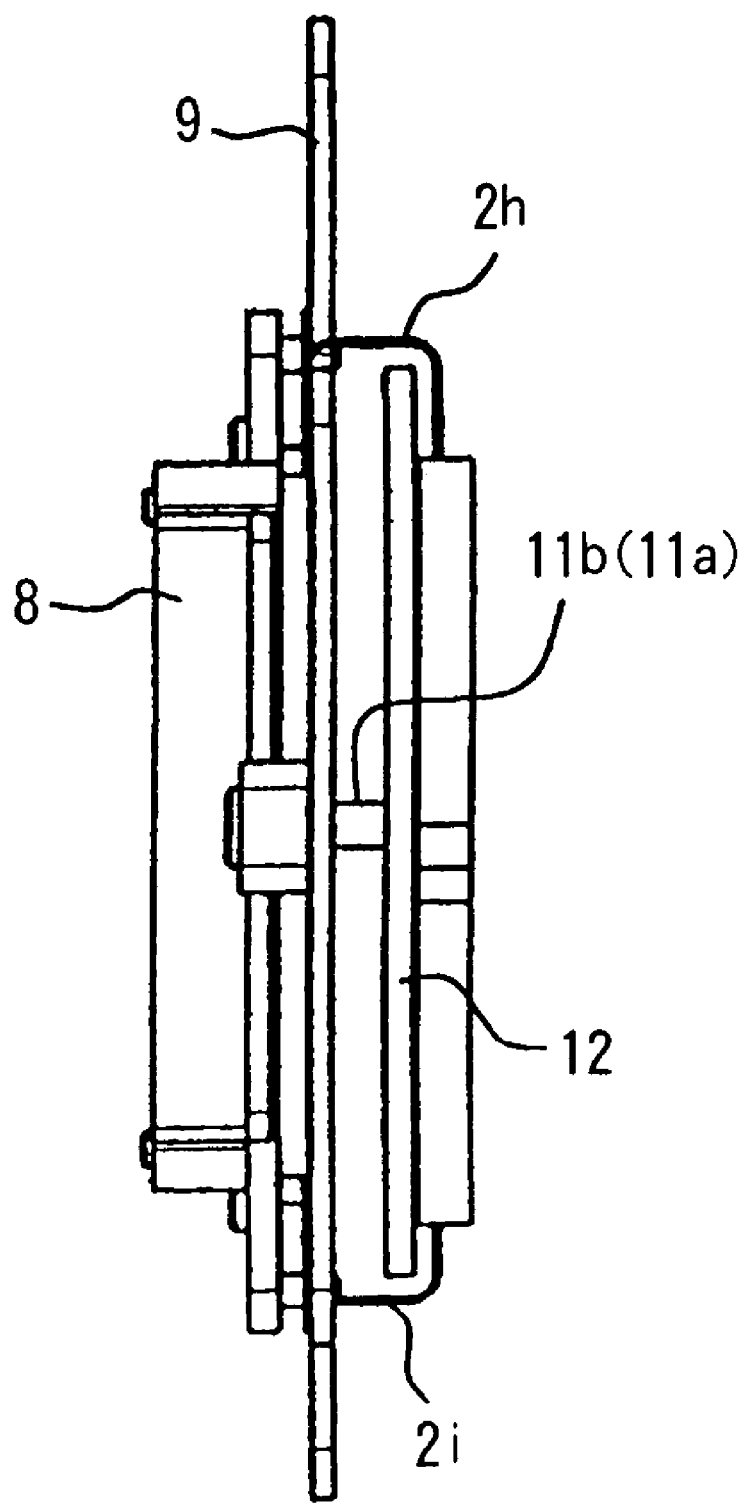
FIG. 8 is a side view of the image-pickup unit of Embodiment 1.
Figure 9:
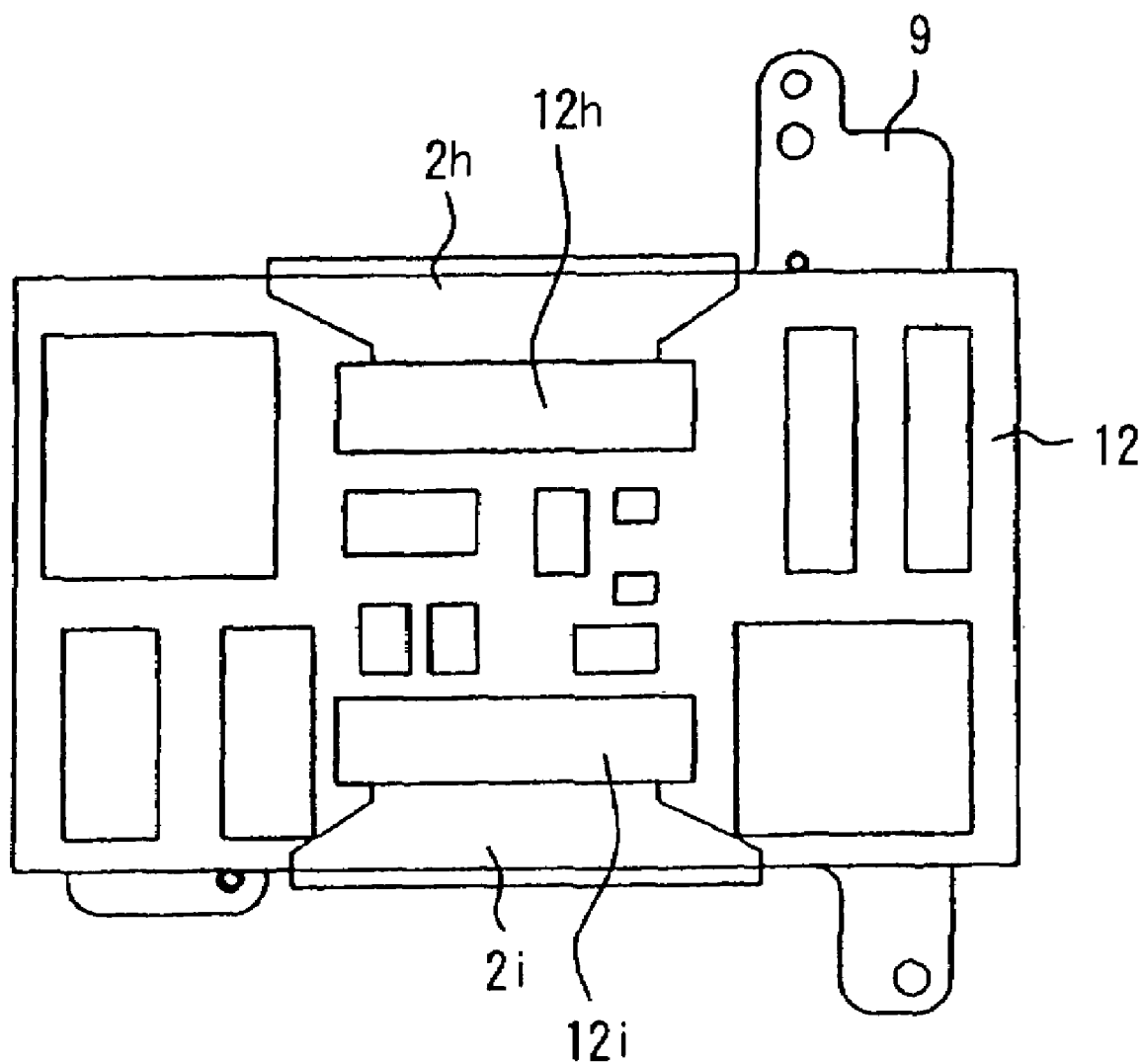
FIG. 9 is a rear view of the image-pickup unit of Embodiment 1.

In the present embodiment, the locating extended portions 2f and 2g and the wiring portions 2h and 2i of the Tab tape 2 are formed in a forked shape, as described above. Therefore, as shown in FIG. 8, when the wiring portions 2h and 2i of the Tab tape 2 are bent to a rear surface and connected to the signal processing board 12, bending positions of the wiring portions 2h and 2i can be set drastically inward (close to the cover glass 1) compared with the related art.

Thus, it is possible to shorten the lengths of the wiring portions 2h and 2i as compared with the related art. By shortening the wiring portions 2h and 2i, the following effects can be obtained.

1) It is possible to repress influence of the electromagnetic noise from the peripheral circuits on the image-pickup signal.

2) Since an entire length of the TAB tape can be shortened, it is possible to reduce the manufacturing cost of the TAB tape.

3) It is possible to miniaturize the camera on which the TAB package is mounted.

In addition, in the present embodiment, the locating extended portions 2f and 2g are formed using extra portions existing outside of the wiring portions 2h and 2i which are disposed at upper and lower portions of the TAB tape 2, and extend substantially parallel to the wiring portions 2h and 2i, as shown in FIG. 1. Accordingly, even when the locating extended portions 2f and 2g are provided, there is no increase in a horizontal width of the TAB tape. Further, even when the locating extended portions 2f and 2g are provided, there is essentially no increase in the manufacturing cost of the TAB tape 2. Further, it is possible to utilize materials with high efficiency.

Further, by providing the locating extended portions 2f and 2g above and below the opening portion 2m (namely, the image-pickup element 3) of the TAB tape 2 interposed diagonally therebetween, a distance between the locating holes 2d and 2e can be increased. Therefore, a rotational backlash of the TAB package can be reduced.

Moreover, even when widths of the wiring portions 2h and 2i are made relatively large, it is possible to form the locating extended portions 2f and 2g reasonably, by offsetting the wiring portions 2h and 2i horizontally to the left and right directions (by offsetting the wiring portions to the opposite sides of the locating extended portions). The above will be described in Embodiment 3.

At a bottom of the periphery of the opening portion 2m in the TAB tape 2, an indexing extended portion 2k is provided at the opposite side of the locating extended portion 2g with the wiring portion 2i interposed therebetween. Similarly to an index indicating a first pin printed on a typical ceramic package electronic component, the indexing extended portion 2k becomes an index indicating a mounting direction for the camera main body of the TAB package. By providing the indexing extended portion 2k, it is possible to confirm the direction even in a state in which the TAB package or the image-pickup unit is assembled. Besides, by incorporating the indexing extended portion 2k into the TAB tape 2, it is not required to provide an additional index. Thus, there is no increase in cost due to an additional indexing portion.

Figure 3:
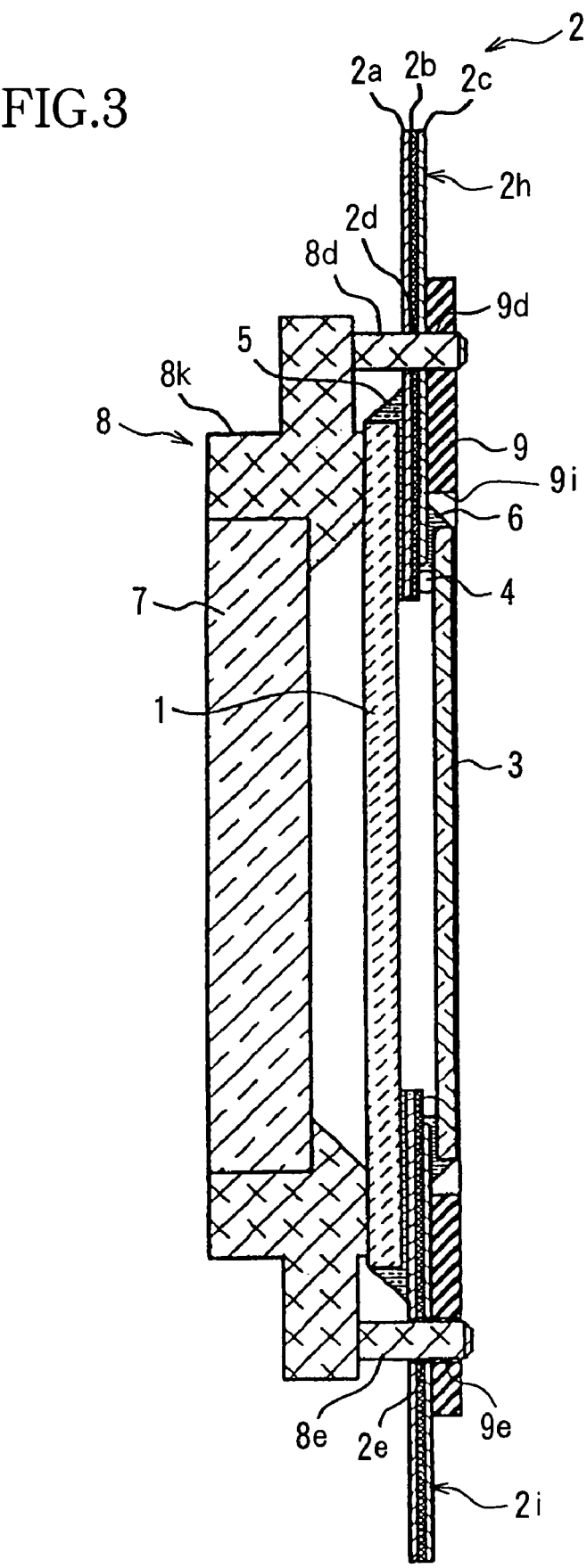
FIG. 3 is a cross-sectional view of the image-pickup unit of Embodiment 1.
Figure 4:
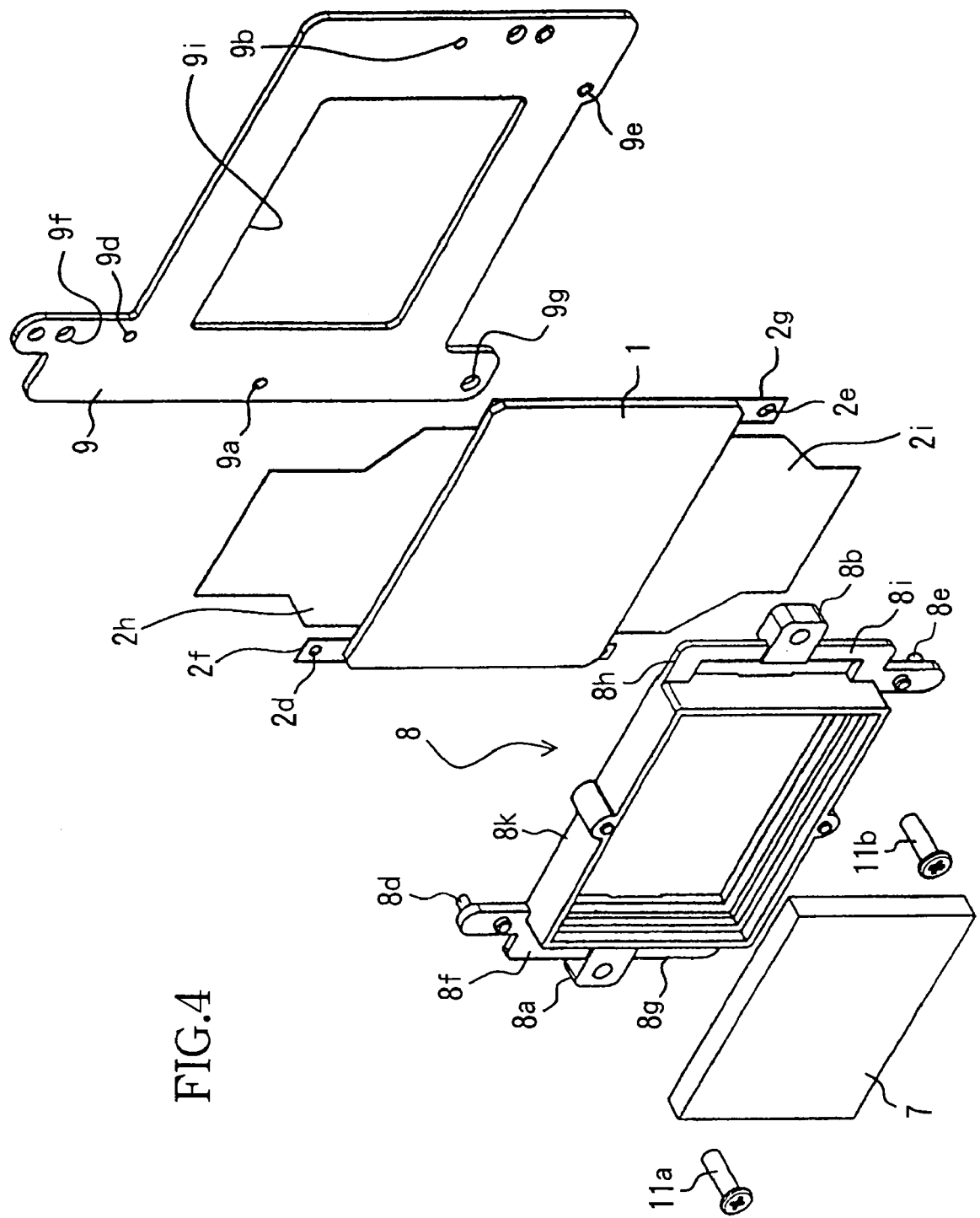
FIG. 4 is an exploded perspective view of the image-pickup unit of Embodiment 1.

FIG. 3 shows the image-pickup unit in which a sensor plate 9 and an optical low pass filter 7 (an optical element: hereinafter, referred to as an LPF) are mounted on the above-mentioned TAB package. Further, FIG. 4 shows an exploded image-pickup unit.

The sensor plate (the first holding member) 9 is provided to be in contact with a rear surface of the TAB tape 2. The sensor plate 9 holds the TAB package, and holds an LPF holder 8 via screw fixing portions 8a and 8b described below, the LPF holder holding the LPF 7 disposed at the front side of the cover glass 1. On the sensor plate 9, an opening portion 9i for containing the image-pickup element 3 connected to the TAB tape 2 is formed.

An outer circumference of the LPF 7 is adhered and fixed to an inside of a rectangular filter frame portion 8k of the LPF holder 8. By sealing with an adhesive, it is repressed that a foreign substance is introduced into a space between the LPF 7 and the cover glass 1 via a gap between the outer circumference of the LPF 7 and an inner circumference of the filter frame portion 8k of the LPF holder 8.

Further, a rear surface of the filter frame portion 8k of the LPF holder 8 is in contact with an outer circumference portion of a front surface of the cover glass 1. Since the LPF holder 8 is supported and pressed to the cover glass 1 as described below, it is repressed that a foreign substance is introduced into a space between the LPF 7 and the cover glass 1 via a gap between the LPF holder 8 and the cover glass 1.

Here, as shown in FIG. 4, at right and left sides of the filter frame portion 8k of the LPF holder 8, elastically deformable arm portions (biasing members) 8f, 8g, 8h, and 8i are formed integrally. Screw fixing portions 8a and 8b are provided between the arm portions 8f and 8g and between the arm portions 8h and 8i, and screws 11a and 11b are inserted through holes of the screw fixing portions 8a and 8b into screw holes 9a and 9b of the sensor plate 9. Accordingly, the arm portions 8f, 8g, 8h, and 8i are flexed, whereby an elastic force is generated. The elastic force functions as a biasing force (energizing force) for pressing the LPF holder 8 to the cover glass 1 (biasing the LPF holder 8 toward the sensor plate 9).

In an image-taking apparatus such as a digital camera, if foreign substances such as dust particles and other impurities are stuck to the light-receiving surface of the image-pickup element or the cover glass close to the light-receiving surface, the foreign substances are imprinted on pickup images. However, if the foreign substances are stuck to an outer surface of the LPF which is spaced apart from the light-receiving surface of the image-pickup element, projections are greatly blurred on the image-pickup element, whereby it is hardly imprinted on pickup images.

Thus, by constituting the image-pickup unit as described above, it is possible to surely prevent the foreign substance such as dirt or dust from being stuck to the light-receiving surface 3a of the image-pickup element 3 or the cover glass 1. As a result, it is possible to obtain high quality pickup images. Further, by assembling the image-pickup unit under circumstances such as a clean room in which dust particles and other impurities are few, it is possible to prevent the foreign substances from being stuck to vicinities of the image-pickup element more surely.

Further, at two diagonal positions in the LPF holder 8 with the filter frame portion 8k interposed therebetween, locating pins 8d and 8e are provided to extend toward the sensor plate 9. The locating pins 8d and 8e are respectively inserted into the locating holes 2d and 2e of the TAB tape 2 and locating holes 9d and 9e which are formed in the sensor plate 9. Moreover, the locating hole 2d of the TAB tape 2 and the locating hole 9d of the sensor plate 9 are circular holes having an inner diameter of almost the same as an outer diameter of the locating pin 8d.

Meanwhile, the locating hole 2e of the TAB tape 2 and the locating hole 9e of the sensor plate 9 are formed in an elongate hole shape in a diagonal direction of the image-pickup element 3 slightly longer than an outer diameter of the locating pin 8e. In this arrangement, it is constituted such that a difference of thermal deformations caused by a difference of thermal expansion coefficients of the LPF holder 8 made of plastic and the sensor plate 9 made of metallic material may be absorbed.

By constituting the image-pickup unit as described above, the LPF holder 8, the TAB package, and the sensor plate 9 are located precisely each other. Further, the TAB package is located in the optical axis direction by sandwiching the cover glass 1 and the TAB tape 2 between the LPF holder 8 and the sensor plate 9. In addition, with this arrangement, the TAB tape 2 is reinforced by the cover glass 1 and the sensor plate 9 to the optical axis direction. Therefore, even when the TAB tape 2 having low strength (rigidity) in the optical axis direction is used, it is possible to hold the position with sufficient strength and position accuracy in the optical axis direction as well as in the direction perpendicular to the optical axis.

Here, in the present embodiment as described above, it is possible to locate precisely the sensor plate 9 and the LPF holder 8 with respect to the TAB package, whereby it is possible to align precisely the LPF 7 with respect to the image-pickup element 3. Accordingly, an extra amount from the outer circumference of an effective light flux for image-taking to an outer circumference end of the LPF 7 is not appreciably required. Thus, it is possible to miniaturize the LPF 7 and further it is possible to contrive cost-down of the LPF 7 which is expensive in general.

In addition, in the present embodiment, the TAB package to which the cover glass 1 and the TAB tape 2 are bonded is sandwiched between the LPF holder 8 and the sensor plate 9. In particular, a connecting portion in the wiring portions 2h and 2i to the cover glass 2 are sandwiched between the LPF holder 8 and the sensor plate 9. Thus, even when an external force is applied to the TAB tape due to bending of the TAB tape 2 or a transport of the TAB package, the connecting portion of the cover glass 1 and the TAB tape 2 is hardly broken.

In addition, in the present embodiment, a contact region in the cover glass 1 with the LPF holder 8, that is, a region of the cover glass 1 to which an elastic force (biasing force) generated by the arm portions 8f, 8g, 8h, and 8i is transferred, and a contact region of the sensor plate 9 in the rear surface of the TAB tape 2 overlap in the optical axis direction (light incident direction to the image-pickup element 3). Further, it is constituted that a rear surface of the contact region in the cover glass 1 is held with the sensor plate 9 via the TAB tape 2. Thus, it is possible to prevent the deformation of the cover glass 1 due to the biasing force, and further it is possible to repress a separation of the connecting portion of the cover glass 1 and the TAB tape 2.

FIGS. 6 to 9 show a state in which the above-mentioned image-pickup unit is connected to the signal processing board 12. The wiring portions 2h and 2i, the upper and lower portions of the TAB tape 2, are bent over to the rear surface, stretched to the upper and lower sides of the signal processing board 12 disposed at the rear surface of the image-pickup unit, and connected to connectors 12h and 12i mounted on the rear surface of the signal processing board 12. In this connection arrangement, it is possible to shorten the wiring portions 2h and 2i, and further it is possible to contrive the miniaturization of the camera.

Figure 6:
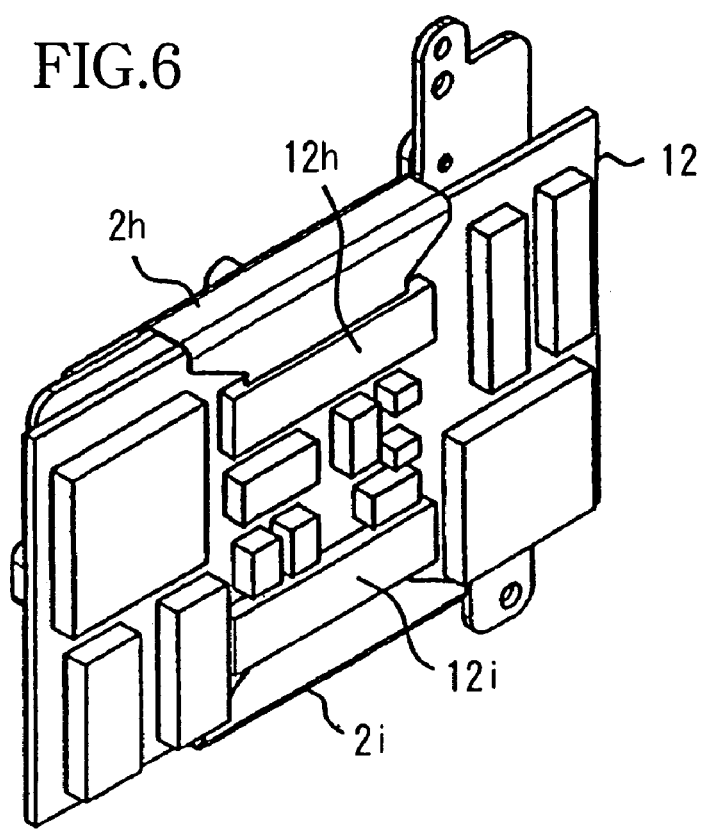
FIG. 6 is a perspective view of the image-pickup unit of Embodiment 1 as seen from a rear side.
Figure 7:
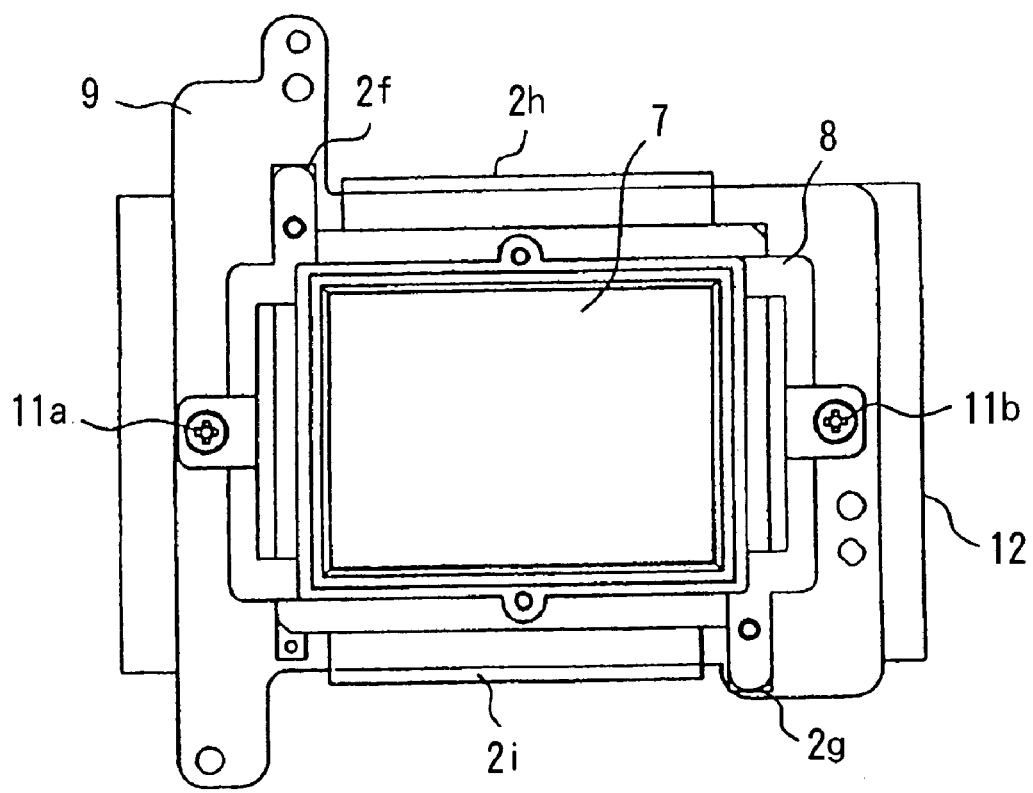
FIG. 7 is a front view of the image-pickup unit of Embodiment 1.

As shown in FIG. 6, on the rear surface of the signal processing board 12, in addition to the connectors 12h and 12i mentioned above, various electronic components are mounted to drive the image-pickup element 3 and process the image-pickup signal from the image-pickup element 3. Further, on the signal processing board 12, a main controller (CPU and the like) for controlling an entire portion of the camera is also mounted.

Further, the screws 11a and 11b, which screw the LPF holder 8 to the sensor plate 9, also screw the signal processing board 12 to the sensor plate 9 with a spacer (not shown) interposed therebetween.

And then, the sensor plate 9 of the image-pickup unit on which the signal processing board 12 is mounted, as shown in FIG. 5, is mounted on a main chassis 15 constituting the camera main body using the screw 18 through the screw holes 9f and 9g. Though not shown, a locating structure is provided between the sensor plate 9 and the main chassis 15. Thus, since the sensor plate 9 is mounted precisely with respect to the main chassis 15, it is possible to align precisely the image-pickup unit (in particular, the image-pickup element 3) with respect to the optical axis of the image-taking lens 17.

Embodiment 2

Figure 10:
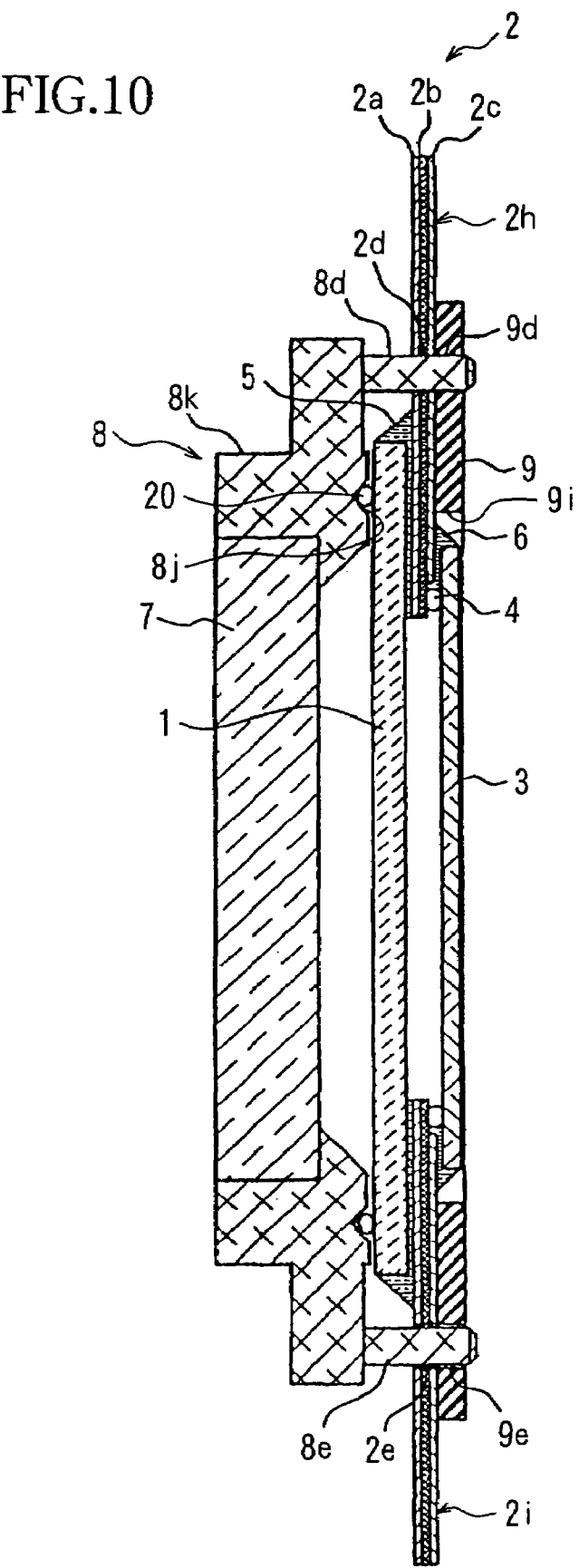
FIG. 10 is a cross-sectional view of an image-pickup unit according to Embodiment 2.

FIG. 10 shows a configuration of an image-pickup unit according to Embodiment 2 of the present invention. Moreover, in FIG. 10, the same reference numerals as in Embodiment 1 represent the same elements.

In the present embodiment, instead of the elastically deformable arm portions 8f, 8g, 8h, and 8i provided in the LPF holder 8 in Embodiment 1, in a groove portion 8j formed on the surface opposite to the cover glass 1 in the filter frame portion 8k of the LPF holder 8, a rubber packing 20 as the biasing member is provided.

The rubber packing 20 is made of rubber having sufficient elasticity. By screwing the screw fixing portion of the LPF holder 8 to the sensor plate 9, the rubber packing 20 is interposed between the LPF holder 8 and the cover glass 1 and held in a slightly compressed state.

Further, while compressed, the rubber packing 20 generates elastic force (biasing force) for biasing the cover glass 1 toward the sensor plate 9. By this biasing force, an entire portion of the TAB package is pressed to the sensor plate 9, and then the locating of the TAB package in the optical axis direction is made.

Further, since the TAB tape 2 (the wiring portions 2h and 2i) is interposed between the cover glass 1 and the sensor plate 9, it is difficult to cause the connecting portion of the cover glass 1 and the TAB tape 2 to be separated even when an external force is applied to the TAB tape 2.

Further, since the TAB package is held using the cover glass 1 and the sensor plate 9 each having high rigidity, a position of the image-pickup element 3 is hardly changed even when a force such as a shock when dropped is applied.

Moreover, in the present embodiment, since the locating pins 8d and 8e of the LPF holder 8 are inserted into the locating holes 2d and 2e of the TAB tape 2 and the locating holes 9d and 9e of the sensor plate 9, the LPF holder 8, the TAB tape 2 and the sensor plate 9 are located each other in the direction perpendicular to the optical axis.

Embodiment 3

Figure 11:
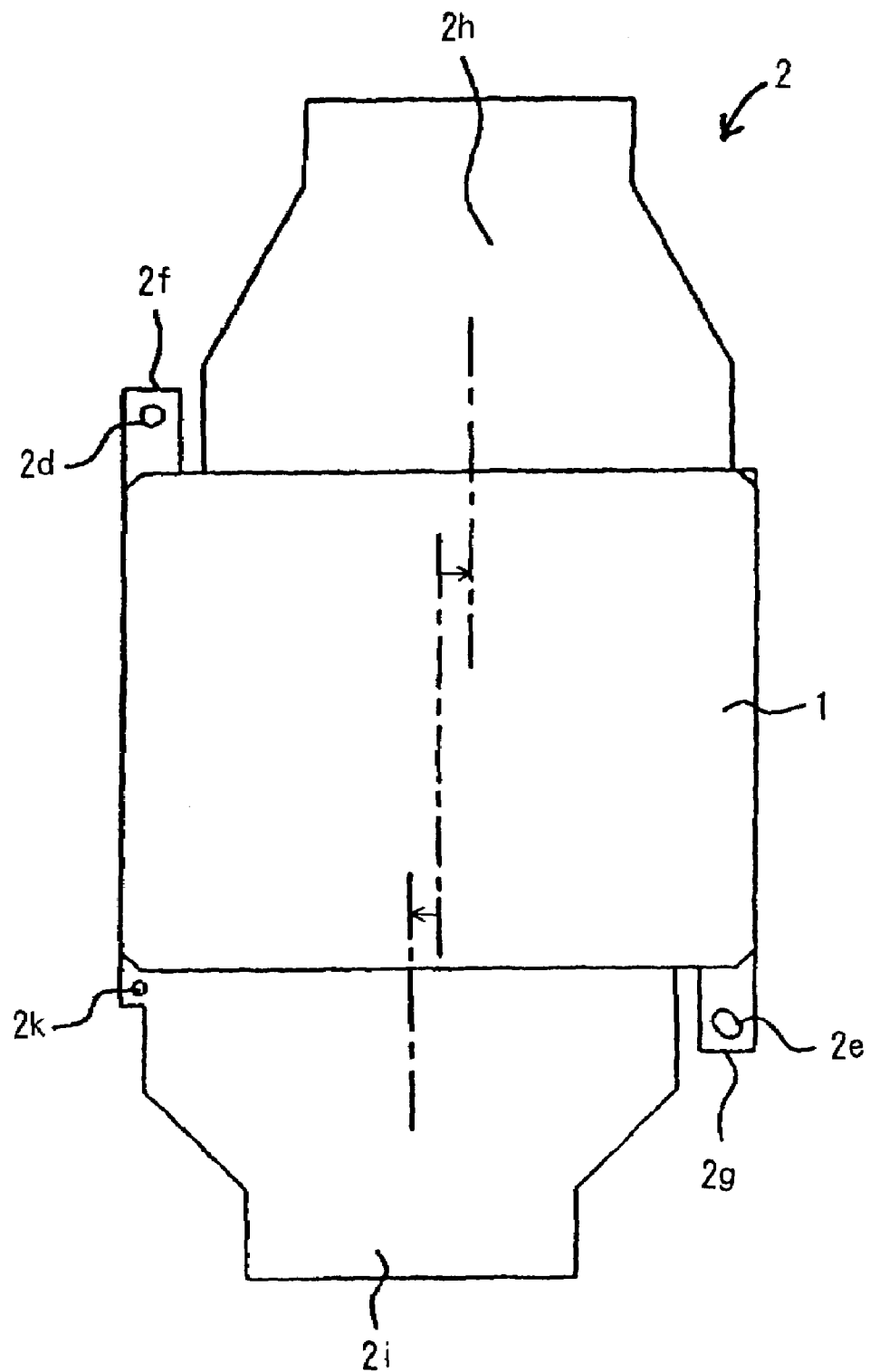
FIG. 11 is a front view of a TAB package which is used for an image-pickup unit according to Embodiment 3.
Figure 12:
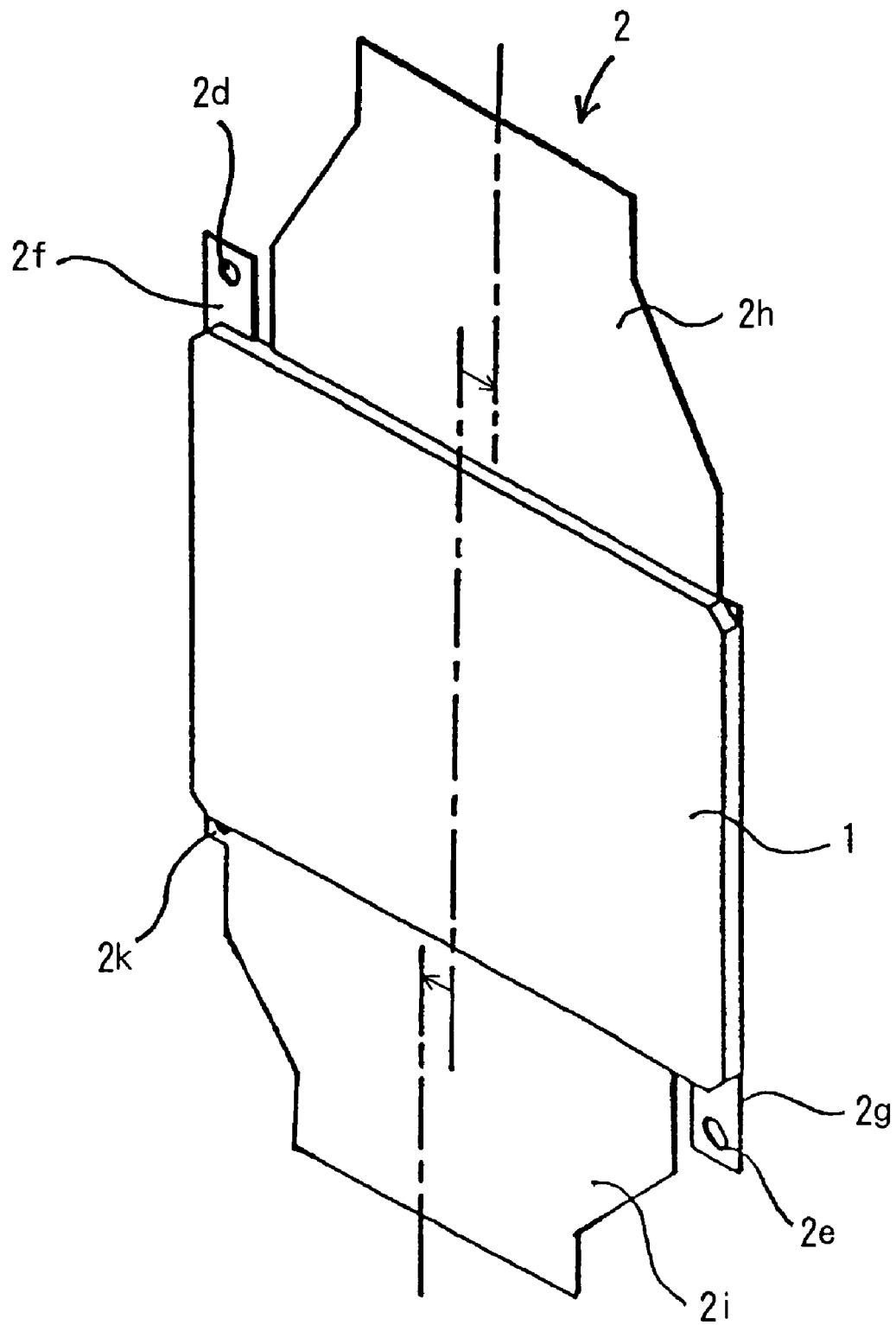
FIG. 12 is a front view of a TAB package which is used for the image-pickup unit according to Embodiment 3.

FIGS. 11 and 12 show a configuration of a TAB package constituting a portion of an image-pickup unit according to Embodiment 3 of the present invention.

In the present embodiment, it is disclosed that the number of copper foil patterns (wiring lines) of the TAB tape 2 connected to the image-pickup element 3 are large and that the widths of the wiring portions 2h and 2i are large, as compared with Embodiment 1.

In the present embodiment, centers of width (left and right) directions of the wiring portions 2h and 2i of the TAB tape 2 are offset oppositely (arrow direction in the drawing) with respect to the locating extended portions 2f and 2g to horizontal centers of the image-pickup element 3 and the cover glass 1. In this arrangement, even when the widths of the wiring portions 2h and 2i are enlarged, it is possible to secure a space for providing the locating extended portions 2f and 2g.

Further, since a indexing extended portion 2k for identifying a direction is not required to be separated from the wiring portion 2i, it is arranged to be together at the side of the wiring portion 2i.

Even when the TAB tape 2 having such a configuration is used, similarly to Embodiment 1, the bending positions of the wiring portions 2h and 2i are not limited due to the locating extended portions 2d and 2g, whereby it is possible to miniaturize the TAB tape.

Embodiment 4

Figure 13:
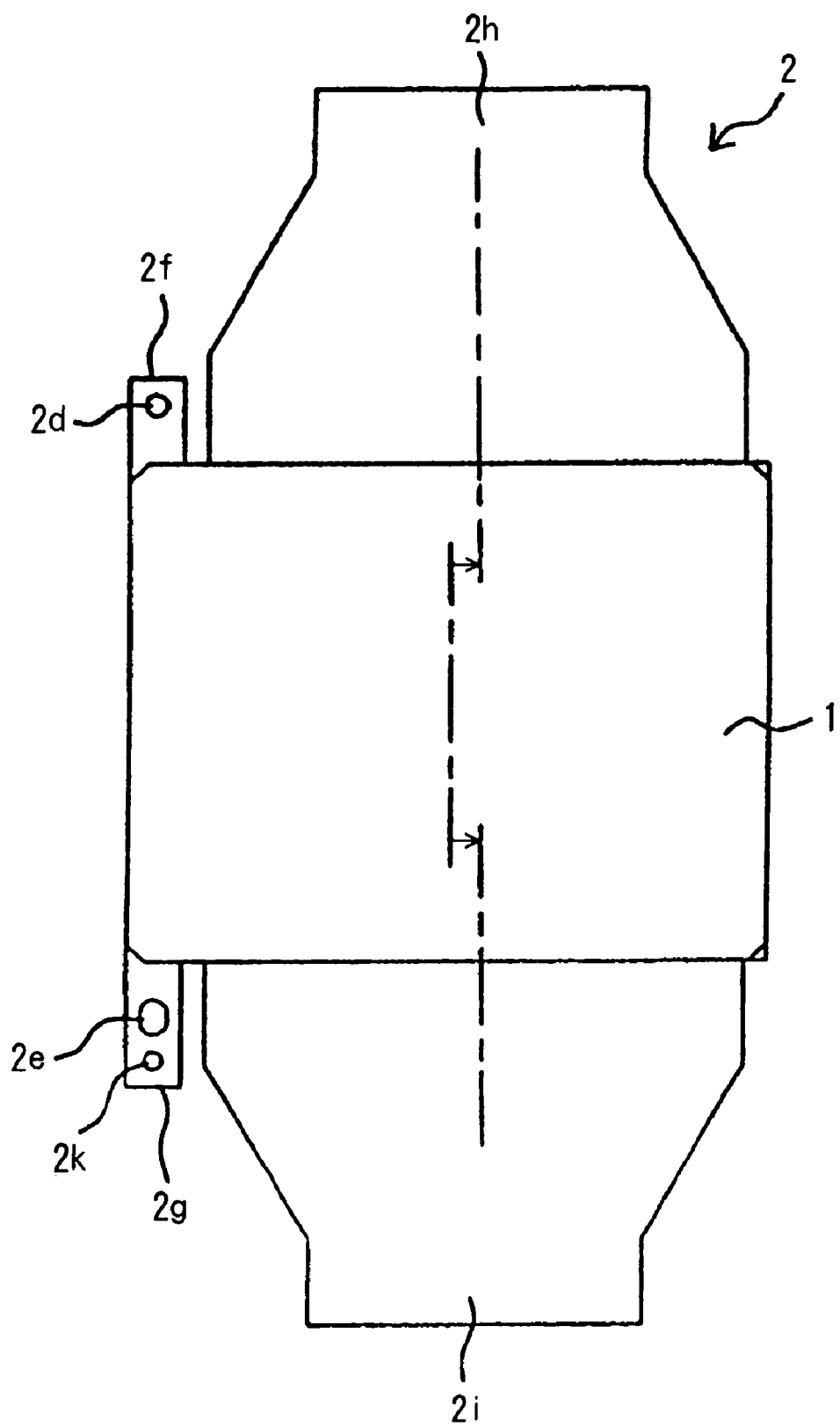
FIG. 13 is a front view of a TAB package which is used for an image-pickup unit according to Embodiment 4.
Figure 14:
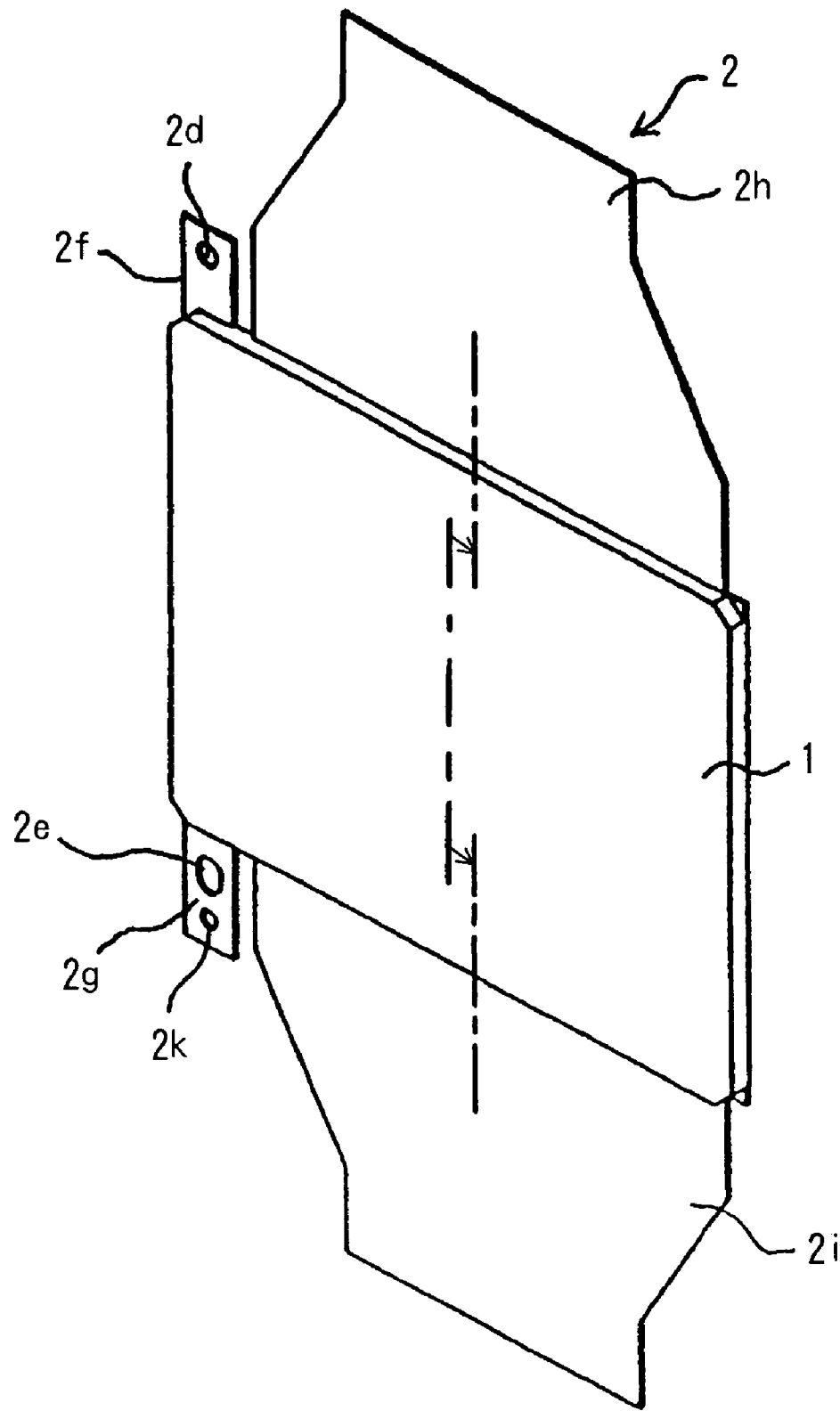
FIG. 14 is a perspective view of a TAB package of Embodiment 4.

FIGS. 13 and 14 shows a configuration of a TAB package constituting a portion of an image-pickup unit according to Embodiment 4.

In the present embodiment, similarly to Embodiment 3, it is disclosed that the widths of the wiring portions 2h and 2i are enlarged. In the present embodiment, the upper and lower locating extended portions 2f and 2g are disposed at the same side in a width direction. Further, centers of the wiring portions 2h and 2i of the TAB tape 2 in the width direction are offset in the opposite direction of the locating extended portions 2f and 2g (namely, the same direction as the arrow in the drawing) with respect to the horizontal centers of the image-pickup element 3 and the cover glass 1. In this arrangement, even when the widths of the wiring portions 2h and 2i are enlarged, it is possible to secure a space for providing the locating extended portions 2f and 2g. The indexing extended portion 2k for identifying a direction is provided in the locating extended portion 2g.

Even when the TAB tape 2 having such a configuration, similarly to Embodiment 1, the bending positions of the wiring portions 2h and 2i are not limited due to the locating extended portions 2d and 2g, whereby it is possible to miniaturize the TAB tape.

As explained above, according to the respective embodiments described above, the image-pickup unit is constituted so that the cover glass and the flexible circuit board are sandwiched between the first holding member and the second holding member. In this arrangement, the locating of the image-pickup element, the cover member, and additionally, the optical element in the optical axis direction are precisely made by pressing the rear surface of the circuit board to the first holding member.

Further, since the flexible circuit board is pressed to the first holding member with the cover glass, it can be hardly deformed due to the cover glass and the first holding member having high rigidity even when a force such as its self weight or a shock when dropped is applied. Therefore, as compared with the related art in which the image-pickup element is held only by the flexible circuit board, it is possible to increase holding strength (rigidity), whereby it is difficult for a position of the light-receiving surface of the image-pickup element to be changed even when an external force is applied.

In addition, since a pressing force is applied between the flexible circuit board and the cover glass due to the biasing force generated by the biasing member, it is possible to prevent the separation (peeling when bonded by adhesion) of the flexible circuit board and the cover glass (in addition, the image-pickup element).

Here, since the biasing member made of biasing portion is integrally formed in the second holding member, it is possible to construct the above structure without increasing the number of components.

Further, since the region in the cover member, to which the biasing force generated by the biasing member is transferred, and the region, where the first holding member is in contact with the first surface of the circuit board, are arranged to be overlapped in the light incident direction on the image-pickup element, it is possible to avoid the deformation of the cover glass or the circuit board or the displacement of the light-receiving surface of the image-pickup element due to the biasing force.

In addition, since the wiring portions of the circuit board are interposed between the cover member and the first holding member, it is possible to repress the separation of the flexible circuit board and the cover glass more effectively.

Further, since, in one holding member of the first holding member or the second holding member, a protrusion portion for locating the one holding member with respect to the other holding member is formed, and since the protrusion portion is inserted into the holes respectively formed in the circuit board and the other holding member, it is possible to simply determine the location of the respective members.

And then, since the first holding member is fixed to the main body (the chassis) of the image-taking apparatus, it is possible to perform the holding and locating of the entire portion of the image-pickup unit with high rigidity.

Further, since the wiring portion and the locating portion of the flexible circuit board are separated from each other, the bending position of the wiring portion is not influenced by the locating portion. Thus, it is possible to set the bending position close to the cover glass when the wiring portion is connected to another board, whereby it is possible to shorten the lengths of the wiring portion.

Therefore, the signal from the image-pickup element is hardly influenced by the external noise, it is advantageous cost-wise due to the short length of the flexible circuit board, and further it is possible to miniaturize the image-taking apparatus.

Here, since a plurality of the locating portions are provided at the positions where the opening portion is interposed therebetween, it is possible to perform the locating of the flexible circuit board with respect to the first holding member surely and simply.

Further, since the indexing portion for indicating the mounting direction of the image-pickup unit is provided on the circuit board and since the indexing portion is exposed outside the cover member fixed to the flexible circuit board, the image-pickup element can be connected to the flexible circuit board without making mistakes on its direction after fixing the cover member.

Moreover, in the respective embodiments described above, the image-pickup unit mounted on the digital (still) camera has been described, however, the present invention can be applied to an image-pickup unit of various image-taking apparatuses using an image-pickup element such as a video camera.

The present invention is not limited to the above-mentioned embodiments, but may be appropriately modified without departing from the scope or spirit of the present invention read from the claims and the specification.

"This application claims priority from Japanese Patent Application No. 2004-296940 filed Aug. 20, 2004, which is hereby incorporated by reference herein."

What is claimed is:

1. An image-pickup device comprising:
an image-pickup element;
a flexible circuit board which is electrically connected to the image-pickup element so that the image-pickup element is disposed at a side of a first surface of the flexible circuit board, the flexible circuit board having a rectangular opening portion through which light guided to the image-pickup element passes and having a wiring portion and an extended portion which are bifurcated with each other on a long side of the rectangular opening portion, the extended portion having a locating hole;
a first holding member disposed at the side of the first surface of the circuit board;
a signal processing board which is disposed at a side opposite to a side of the flexible circuit board with respect to the first holding member and connected to the image-pickup element through the wiring portion bent along the first holding member; and
a second holding member which is disposed at a side of a second surface opposite to the first surface of the flexible circuit board and held by the first holding member to bias the flexible circuit board toward the first holding member,
wherein one holding member of the first and second holding members has a pin for locating the one holding member with respect to the other holding member, and
wherein the pin is inserted into a hole formed in the other holding member passing through the locating hole when the second holding member is held by the first holding member.

2. The image-pickup device according to claim 1, wherein the flexible circuit board has a plurality of extended portions, and the extended portions are provided at positions where the rectangular opening portion is interposed therebetween.

3. The image-pickup device according to claim 1, wherein the extended portion extends substantially parallel to the wiring portion.

4. The image-pickup device according to claim 1, further comprising a cover member which is fixed to the second surface of the flexible circuit board to cover the rectangular opening portion, wherein the second holding member biases the flexible circuit board through the cover member.

5. The image-pickup device according to claim 1, wherein the second holding member has an elastically deformable arm portion and the flexible circuit board is biased by receiving an elastic force of the arm portion.

6. An image-pickup device according to claim 5, wherein the pin extends from the arm portion.

7. An image-pickup unit device according to claim 1, further comprising an elastically deformable member which is disposed between the flexible circuit board and the second holding member,
wherein the flexible circuit board is biased toward the first holding member by receiving the elastic force of the elastically deformable member.

* * * * *